US006609039B1

(12) United States Patent
Schoen

(10) Patent No.: US 6,609,039 B1
(45) Date of Patent: Aug. 19, 2003

(54) SIMULTANEOUS MULTI-USER AUDIO RE-TRANSMISSION DIGITAL RADIO MODULE

(76) Inventor: Neil Charles Schoen, 9817 Freestate Pl., Gaithersburg, MD (US) 20879

( * ) Notice: Subject to any disclaimer, the term of this patent is extended or adjusted under 35 U.S.C. 154(b) by 0 days.

(21) Appl. No.: 09/122,701

(22) Filed: Jul. 27, 1998

(51) Int. Cl.[7] .................. G06F 17/00
(52) U.S. Cl. .................. 700/94; 370/478; 375/216
(58) Field of Search .................. 700/94; 381/77, 381/80, 81, 85, 1, 2; 370/478, 479; 375/216, 242, 316

(56) References Cited

U.S. PATENT DOCUMENTS

| | | | | |
|---|---|---|---|---|
| 4,980,665 A | * 12/1990 | Schotz | .................. | 340/310.02 |
| 5,278,837 A | * 1/1994 | Kelley | .................. | 370/343 |
| 5,579,124 A | * 11/1996 | Aijala et al. | .................. | 381/2 |

* cited by examiner

*Primary Examiner*—Ping Lee

(57) ABSTRACT

A digital audio signal processing and distribution sub-assembly unit, plug compatible or integratable with single user digital radios, for audio channels and simultaneous re-transmission to multiple user headsetss. The sub-assembly will enable multiple users to select individual channels for listening, via audio headsets, from satellite digital radio broadcasts, which will encompass up to 100 channels of music and talk show programming. Headsets will have either direct wire connections to the digital radio receiver (via a jack connection), or infra-red (IR) links or RF links, which can allow the user to roam significant distances from the radio without the encumbrance of a wire link. The unit will function in automobiles or in homes, with auto usage eventually implemented with interior wiring with access jacks for the headsets built into doors and dashboards. The sub-assembly unit will be tailored to handle a variety of satellite broadcast protocols, such as OFDM (orthogonal frequency division multiple access) and CDM (code division multiple access or spread-spectrum). The sub-assembly unit is designed to integrate with the "back end" of the new generation of satellite digital radio receivers.

4 Claims, 7 Drawing Sheets

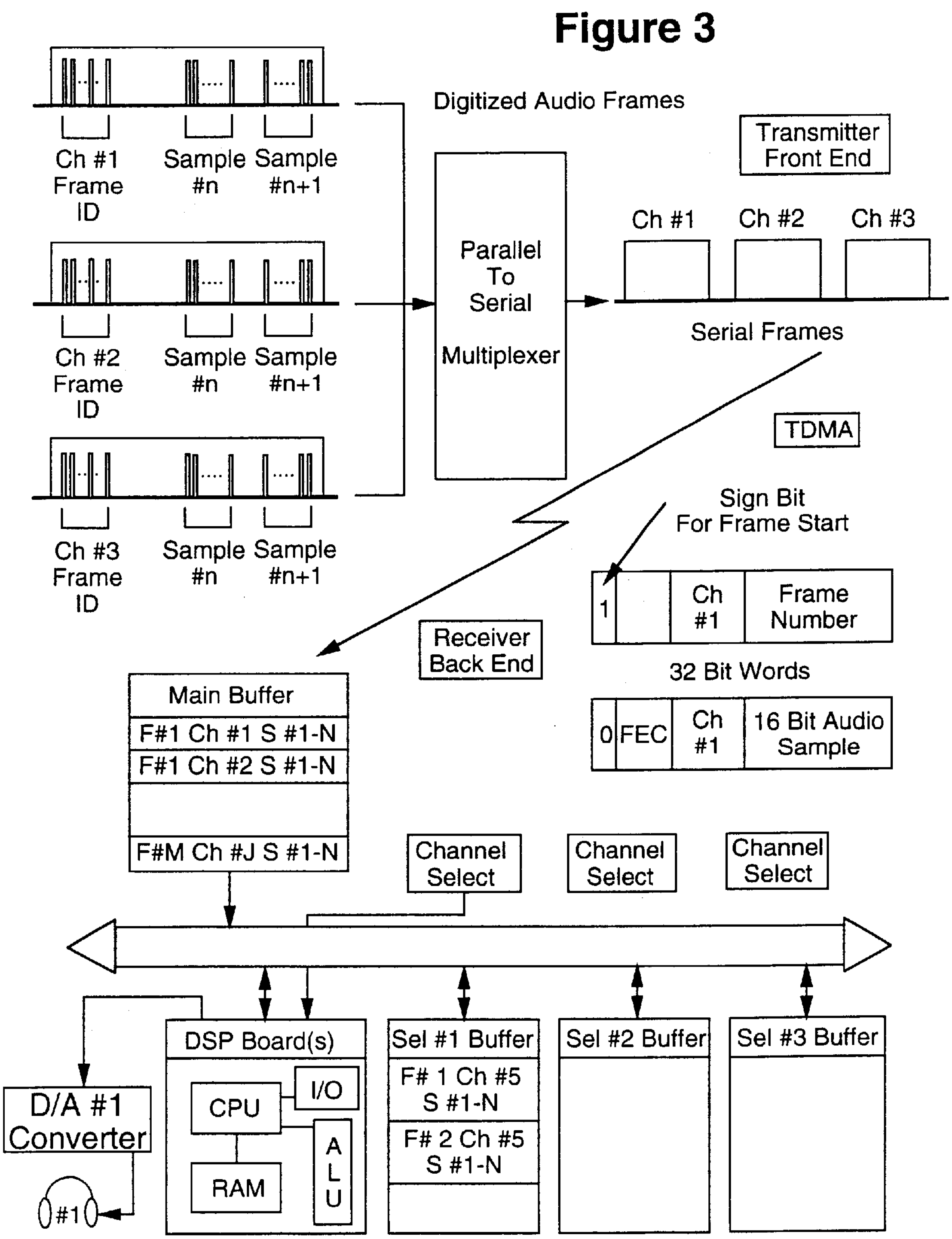
Figure 3
Digitized Audio Frames
Ch #1 Frame ID
Sample #n
Sample #n+1
Ch #2 Frame ID
Sample #n
Sample #n+1
Ch #3 Frame ID
Sample #n
Sample #n+1
Parallel To Serial Multiplexer
Transmitter Front End
Ch #1
Ch #2
Ch #3
Serial Frames
TDMA
Sign Bit For Frame Start
1
Ch #1
Frame Number
32 Bit Words
0
FEC
Ch #1
16 Bit Audio Sample
Receiver Back End
Main Buffer
F#1 Ch #1 S #1-N
F#1 Ch #2 S #1-N
F#M Ch #J S #1-N
Channel Select
Channel Select
Channel Select
DSP Board(s)
CPU
I/O
RAM
A L U
D/A #1 Converter
#1
Sel #1 Buffer
F# 1 Ch #5 S #1-N
F# 2 Ch #5 S #1-N
Sel #2 Buffer
Sel #3 Buffer

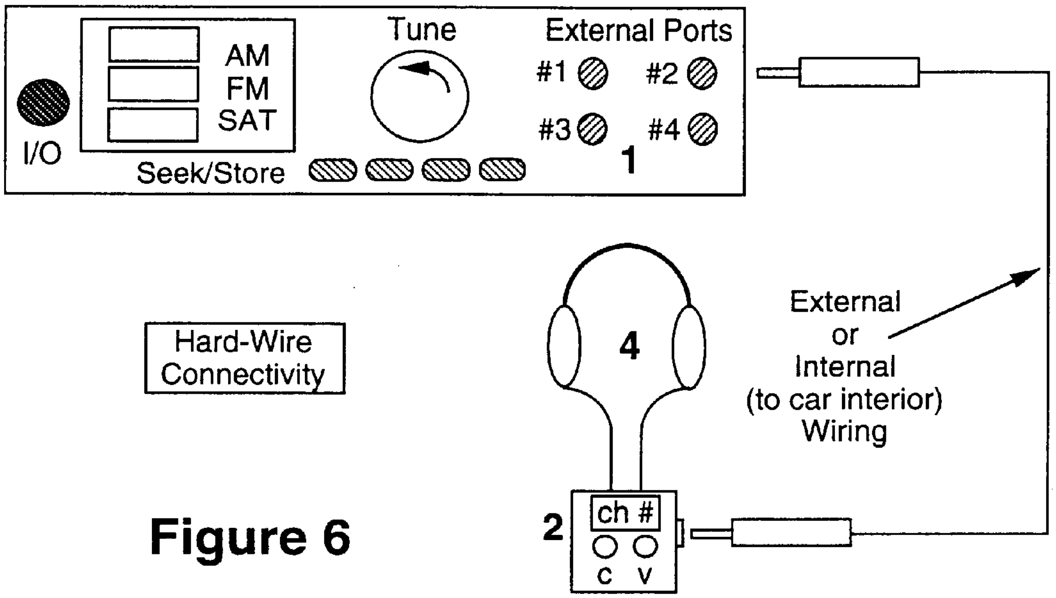
Figure 6
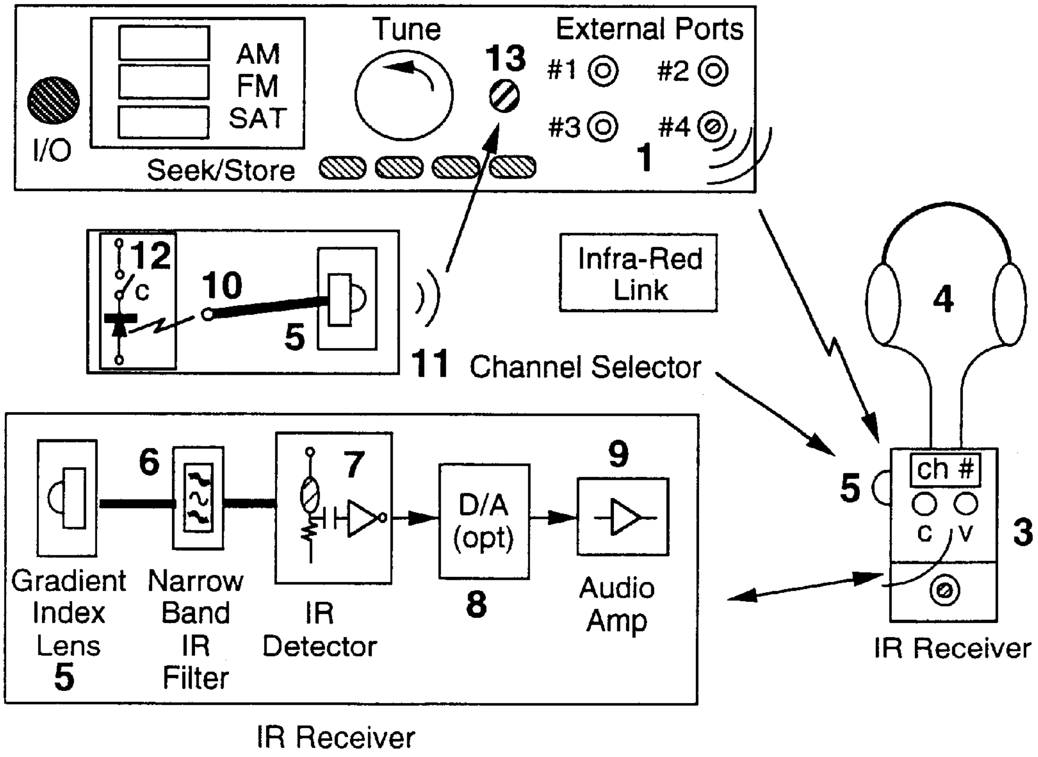

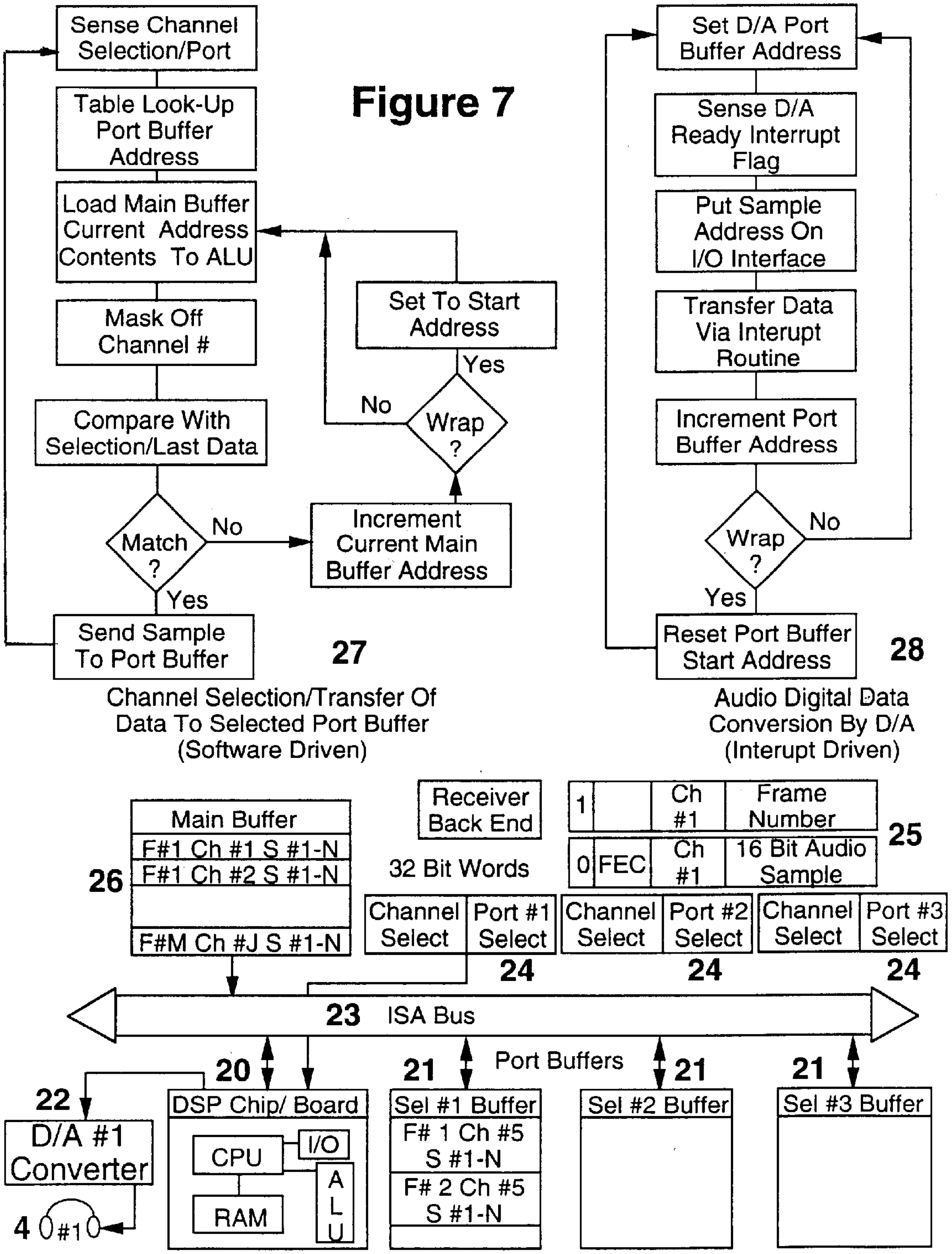
Figure 7
Sense Channel Selection/Port
Table Look-Up Port Buffer Address
Load Main Buffer Current Address Contents To ALU
Mask Off Channel #
Compare With Selection/Last Data
Match ?
No
Yes
Increment Current Main Buffer Address
Wrap ?
No
Yes
Set To Start Address
Send Sample To Port Buffer
27
Channel Selection/Transfer Of Data To Selected Port Buffer (Software Driven)
Set D/A Port Buffer Address
Sense D/A Ready Interrupt Flag
Put Sample Address On I/O Interface
Transfer Data Via Interupt Routine
Increment Port Buffer Address
Wrap ?
No
Yes
Reset Port Buffer Start Address
28
Audio Digital Data Conversion By D/A (Interupt Driven)
Main Buffer
F#1 Ch #1 S #1-N
F#1 Ch #2 S #1-N
F#M Ch #J S #1-N
26
Receiver Back End
32 Bit Words
1
Ch #1
Frame Number
0
FEC
Ch #1
16 Bit Audio Sample
25
Channel Select
Port #1 Select
24
Channel Select
Port #2 Select
24
Channel Select
Port #3 Select
24
23
ISA Bus
20
DSP Chip/ Board
CPU
I/O
RAM
A L U
22
D/A #1 Converter
4
#1
21
Port Buffers
Sel #1 Buffer
F# 1 Ch #5 S #1-N
F# 2 Ch #5 S #1-N
21
Sel #2 Buffer
21
Sel #3 Buffer

SIMULTANEOUS MULTI-USER AUDIO RE-TRANSMISSION DIGITAL RADIO MODULE

INTRODUCTION

The development of satellite digital radio broadcasting systems, expedited by the recent 1997 Federal Communications Commission (FCC) issuance of two commercial broadcasting licenses, is expected to accelerate the migration from traditional analog technology to digital radio receivers, for both local terrestrial and wide-area satellite based transmission of radio programming. The advent of the satellite-based technology will allow a relatively simple and lower cost implementation of multiple-user radios, due in part to the high data rate and bandwidths available to the new satellite radio digital broadcasts, and the significant amount of digital processing which will take advantage of the speed and ease of data handling made available by digital signal processing (DSP) chips and personal computer (PC) programming technologies. Because the audio is converted to digital data, which can be compressed to reduce the number of samples required for faithful reproduction, and transmitted at much higher data rates than constraints placed on analog representations, there is time at the receiver end to process a large number of audio channels and provide simultaneous feeds with a common "front end". Thus, this invention is targeted at utilizing the increases in digital data processing speeds and low costs of standard computer hardware/software to allow the introduction of a new product, the multi-user radio, which will allow several different listeners to access different audio channels simultaneously, at much less cost than purchasing separate individual digital radios. Although individuals can now purchase products such as CD and cassette players to listen to music, purchases are required for the CDs and cassettes. While inexpensive portable radios exist today that are based on analog signal reception, migration to 100 channel digital radios will increase the expense of the basic radio receiver and, for example, make the purchase of three or four separate radios with headsets for the family car prohibitive.

Although the technology to enable a similar product for terrestrial digital radio broadcasts, which will be limited to the same frequency allotments (referred to as in-band-on-channel or IBOC) will be similar, the lower carrier frequencies and bandwidths will likely reduce the number of channels that can be "scanned" for multi-user radios. Nonetheless, it is expected that this product will still be desirable for a large number of users.

BACKGROUND

Analog AM and FM radio receivers have been in use for almost a century, and integrated circuit technology has allowed them to be miniaturized and mass produced at low cost. Digital technology introduction into conventional analog radio has been surprisingly slow, considering the advent almost twenty years ago of the personal computer, the prime driver of digital technologies. The advent of cellular telephones provided the impetus for the migration of computer digital processing into the communications market, by putting together the multi-channel aspect of telecommunications along with the development of various transmission protocols (such as FDMA and CDMA) necessary to handle many users with a limited amount of bandwidth. The transformation from analog cellular to digital terrestrial and satellite cellular systems is proceeding rapidly at this time due to the advantages of digital over analog, and the continuing drop in the cost of digital technology components.

Two corporations, CDRadio and Worldspace, are constructing geosynchronous satellite-based digital radio systems, with approximately 100 channel capacity. Descriptions of these systems, including design concepts, how they interface with conventional analog AM and FM receivers, and performance estimates and field test results, are provided in the reference listings in the following paragraphs. Information on the design basics of conventional AM and FM receivers, digital signal processing techniques and computer architectures appear in the text book reference at the end of the reference listings. Limited information on the design of the satellite digital radio receivers is available, due to the proprietary nature of the systems and the lack of firm designs at this stage of implementation. However, for purposes of defining the performance of this invention, a sub-assembly unit for simultaneous multi-user audio retransmission (SMART radio), basic frequency and bandwidth assignment estimates will be used. The two competing satellite digital radio systems have carrier frequencies in the 1–2 GHz spectrum region, with bandwidths of about 10–20 MHz. It is anticipated that transmission protocols may be different, with variations of OFDM (orthogonal frequency division multiplexing) and spread spectrum (CDMA) techniques to be used. The basic principles of these protocols appear in the reference listing below, and example implementation approaches are described in following sections, for the purposes of showing what interfacing is needed for the SMART radio sub-assembly to integrate into the digital receivers that will be built for the satellite digital radio systems.

References

Satellite Digital Radio:

"DAR Mobile Demonstration", R. Briskman, AIAA-94-1080, 15th International Communications Satellite Systems Conference, Feb. 24–Mar. 3, 1994, San Diego, Calif.

"Satellite DAB", Robert D. Briskman, International Journal of Satellite Communications, Vol. 13, pg. 259–266 (1995).

"Overview of Techniques for Mitigation of Fading and Shadowing in the Direct Broadcast Satellite Radio Environment", David Bell, John Gervargiz, Arvydas Vaisnys and David Julian, JPL/California Institute of Technology, Pasadena, Calif. 91109.

FDM Protocol:

"COFDM: An Overview", William Y. Zou and Yiyan Wu, IEEE Transactions on Broadcasting, Vol. 41, No. 1, March 1995.

"Performance Evaluation of COFDM for Digital Audio Broadcasting, Part I: Parametric Study", Louis Thibault and Minh Thien Le, IEEE Transactions on Broadcasting, Vol. 43, No. 1, March 1997.

"Performance Analysis of a COFDM/FM In-Band Digital Audio Broadcasting System", Pascal Salart, Michel Leclerc, Paul Fortier and Huu Tue Huynh, IEEE Transactions on Broadcasting, Vol. 43, No. 2, June 1997.

"OFDM Performance in Amplifier Nonlinearity", S. Merchan, A. Garcia Armada and J. A. Garcia, IEEE Transactions on Broadcasting, Vol. 44, No. 1, pg. 106, March 1998.

"An OFDM All Digital In-Band-On-Channel (IBOC) AM and FM Radio Solution Using the PAC Encoder", R. L. Cupo, M. Sarraf, M. Shariat and M. Zarrabizadeh, IEEE Transactions on Broadcasting, Vol. 44, No. 1, pg. 22, March 1998.

CDM Spread Spectrum Protocol:

"Soft Synchronization of Direct Sequence Spread-Spectrum Signals", Brian G. Agee, Roland J. Kleinman and Jeffery H. Reed, IEEE Transactions on Broadcasting, Vol. 44, No. 11, March 1996.

"Soft Multiuser Decoding for Vector Quantization Over a CDMA Channel", Mikael Skoglund and Tony Ottosson, IEEE Transactions on Broadcasting, Vol. 46, No. 3, March 1998.

Basic Communications and Computer Technology:

"Electrical Engineering: Concepts And Applications", Second Edition, A. Bruce Carlson and David G. Gisser, Chapters 13,14 and 15, Addison-Wesley Publishing, 1990.

SUMMARY OF THE INVENTION

The basic components of the integration package to provide simultaneous multiuser capability to the digital radio receiver are as follows. A digital signal processing unit (composed of commercial DSP chips or boards, for example) is required to access the digital audio data that is buffered in the main receiver. An industry-standard ISA bus provides connectivity of the DSP components with individual port buffers that will store digital audio data for user-selected channels. The signal processing unit handles selection and transfer of channel audio sample digital data to the correct port buffers. Transfer of the digital port buffer data to a digital to analog (D/A) converter can be accomplished via standard computer interrupt software and hardware, or can be driven by software, either directly (analogous to computer technology) via arithmetic logic unit (ALU) and register use, or by the equivalent of direct memory access (DMA) transfers common in computer systems (which occurs after transfer addresses are provided, "automatically" by the processor using clock cycle stealing). The D/A converter transforms the digital audio samples (after proper decoding and decompression) to an analog signal, which is then routed to a headset unit for user listening. All of the complex steps involved in the reception of the satellite signal including; audio compression, error protection encoding, encryption of transmission data, channel multiplexing from parallel to serial form, provision for stereo reception, signal processing for forward error correction due to fading or blocking of the broadcast signal, and correction for Doppler shifts (for car receivers), are handled by, and are specific to the digital radio receiver designed by or for the two satellite broadcasting corporations. This invention integrates "on top" of the systems that will be incorporated in the first versions of the commercial receivers that will be sold to subscribers of the satellite digital radio service. It is anticipated that the SMART radio unit will be integrated by the radio receiver manufacturers by having it offered as a priced option.

A separate headset for listening and selection of audio channels comprises the second sub-component of the SMART radio package. The headset can be connected directly to the receiver via wire/jack connections, which would be suitable for car radio use. The headset would have a small attachment that allows the user to select a channel for listening, as well as adjust the volume of the sound. The channel selection would result in a digitized channel number that would be sensed by the SMART radio signal processor and used to direct digital audio samples to the appropriate port buffer. Options to provide car interior wiring, with jacks provided in door panels or dashboards, is likely. Volume control could be handled at the headset or via a control signal to the D/A converter output interface/amplifier.

Another linkage technique, that of an infra-red (IR) transmitter/receiver, could be used to connect the headsets to the radio receiver, which is more suitable to home used which can require greater distances between headset and receiver (use in other rooms, for example). The IR link could be either analog audio, or be driven off the digital signals, depending on cost trade-off analyses. Use of very narrow optical filters (in conjunction with narrowband light emitters such as laser diodes) will prevent interference with other headsets, and will also enable relatively long distance connections, since ambient stray light leakage power can be heavily reduced by narrowing the filter bandwidth. IR frequencies and power will be consistent with eye safety standards and eliminate concerns of health hazards.

DESCRIPTION OF THE FIGURES

FIG. 3. illustrates an example multiplexing of parallel channels of digitized audio data using a TDM protocol, prior to processing, modulation and transmission by a satellite digital radio system, and the hardware used to enable simultaneous multi-user re-transmission to users headsets.

FIG. 6. shows how the simultaneous multi-user audio re-transmission (SMART) radio functions are integrated with the digital radio receiver, for both headset hard-wire connectivity, and an example infra-red (IR) receiver for headset IR linkage.

FIG. 7. shows a block diagram and software flow charts for the hardware and software functions executed by the SMART radio sub-assembly unit

DETAILED DESCRIPTION OF THE PREFERRED EMBODIMENTS

Figure 1:
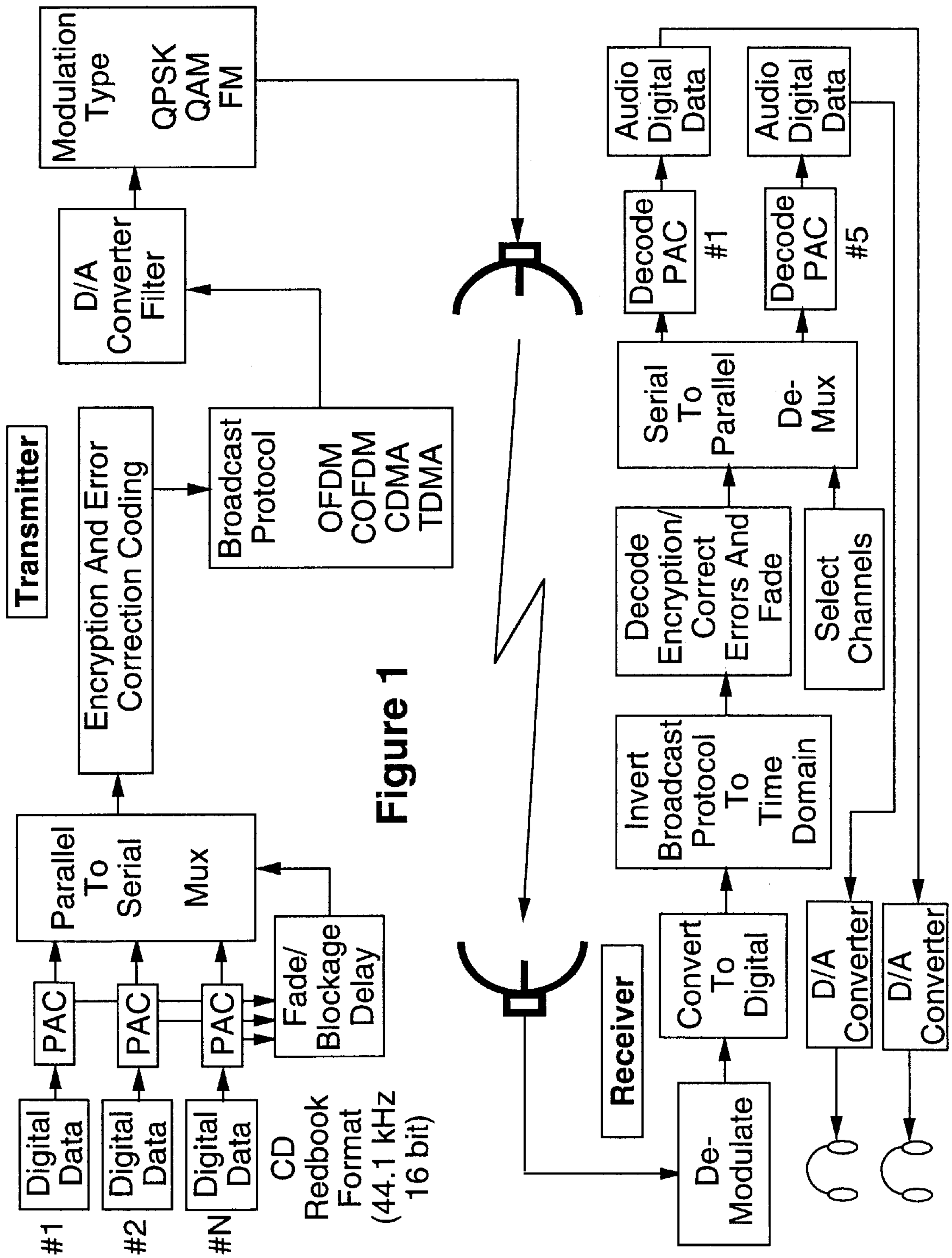
FIG. 1. shows a generic block diagram which represents the functions performed by transmitter and receiver hardware and software comprising a satellite-based digital radio system.

The following discussion is based on the assumption of a 100 channel satellite digital radio broadcasting system, such as that proposed by CDRadio Corporation, for performance and feasibility calculations of the SMART radio sub-assembly unit invention. The CDRadio system will likely use a carrier frequency of about 2.3 GHz, with a bandwidth of about 12.5 MHz, which is consistent with the FCC licenses granted. Modulation is expected to be some form of phase shift keying (DPSK or QPSK). Also assumed is that the digital audio data will be in stereo CD format (e.g., "redbook"), which means that analog, audio is sample at a 44.1 kHz rate, with 16 bit A/D conversion (and frame or block sizes of 1024 samples per block), which results in a bit rate of a little less than 1.5×E+6 bits per second (bps) per audio channel. Furthermore, the Perceptual Audio Coder (PAC) audio compression algorithm developed by Lucent Technologies Corporation will be assumed to be used, which would result in a maximum compression ratio of about 11:1 for the highest quality compression. Thus, use of PAC compression will drop the bit rate per channel to roughly 150 K bps.

The first analyses that follow is to ascertain that the frequencies and bandwidth are sufficient to allow real-time transmission of all 100 channels of audio irrespective of the transmission protocols to be used. The simplest to analyze is the TDM protocol, in which channel digital audio data is interleaved prior to modulation and transmission. Error correction and encryption coding is assumed to have been implemented prior to multiplexing (e.g., Viterbi algorithm and Reed-Solomon algorithm for bit error correction, and government-approved encryption with pseudo-random key, or multiple keying, at transmit/receive locations). The bit rate limit for the carrier frequency is set by the Nyquist theorem, as explored by Shannon in the early 1940s. For this example, about one nanosecond bit widths will be assumed, which is about a 10 times lower bit rate (about 800 E+6 bps) than the theorem allows, based on a 2.3 GHz carrier. Thus for 100 channels, the available bit rate is about 800,000 per second. After audio compression, the channel bit rate should be about 150,000 per second, so that even if the signal load is doubled to provide forward error correction (FEC), there is sufficient time to transmit all channels. Of course, using a single narrow band carrier transmission will make such a system susceptible to frequency fades or signal outage from interference due multipath effects, which is why most prototype systems tested to date have not used straight TDM protocols. For FDMA systems, the FCC bandwidth allotments to terrestrial FM channels is about 400 kHz (with 100 kHz DSB main bands and 100 kHz DSBs at −25 dB). However, the entire signal is usually inserted in a single side band (SSB) of 100 kHz. Thus 100 channels would occupy about 10 MHz of bandwidth without any frequency compression techniques if conventional analog FM audio modulation were utilized for each channel, which just matches the available 12.5 MHz FCC allocation. However, for digital representation of the data, the bandwidth for each channel would be inversely proportional to the pulse width, which for uncompressed data would be about 1.5 MHz and 150 kHz for compressed data. Thus 100 channels of compressed data would occupy about 15 MHz, close to the allowed bandwidth. Spread spectrum or CDM protocol can be equivalent to spreading each FDM band over the entire bandwidth, and so should be feasible based on the above FDM estimate. Recognize that traditional one channel selection ignores other channels presence and does not process the other channel data, so the issue of being able to process all channel data and reconstruct the analog audio signal for simultaneous real-time use is critical to the feasibility of SMART radio functioning. Even though digital audio data can be transmitted much faster than for real-time D/A conversion to audio (since it is stored on CDs or DATs and is not necessarily a real-time analog input such as would be available at a live performance), the transmission rate has to be balanced with the receiver processing rate or else storage buffers will overflow and signal data will be lost.

It is necessary to have an understanding of all the satellite digital radio signal processing techniques, as well as the conventional AM and FM signal handling, to be able to design an interface for the SMART radio feature. FIG. 1 is a generic block diagram of a complete satellite digital radio broadcasting system (transmitter and receiver), illustrating many of the operations common to the various transmission protocols. The major receiver functions are as follows (the transmission functions are in general the reverse order and inverse of the receiver functions).

The receiver must first demodulate the signal. Typical modulation schemes used are FM (for conventional analog radio) and quadrature phase shift keying (QPSK) or quadrature amplitude modulation (QAM). The parallel data in the transmitter can be grouped to form complex numbers for 16 QAM or QPSK modulation. These numbers can be modulated in baseband fashion using inverse fast Fourier transforms. This approach allows elimination of bandpass filtering, as in conventional FDM. Alternately, the modulation can be done in individual bands as in conventional FDM. Whatever scheme is used, the demodulation takes place first in the receiver, followed by conversion of the signal to digital via an analog-to-digital converter (A/D). Next the data stream must be reverted to the time domain if OFDM or CDM techniques were used. At this point, the data is un-encrypted and corrected for bit errors and fade resulting from transmission and reception. The digital data can now be demultiplexed from parallel to serial based upon channel selection/identification. The audio decompression (the example shown uses the Perceptual Audio Coder or PAC algorithm) is done and the reassembled channel audio digital data (now in CD "redbook" format for example) is sent to a digital-to-analog converter (D/A) to generate sound waves in a speaker or headset.

Figure 2:
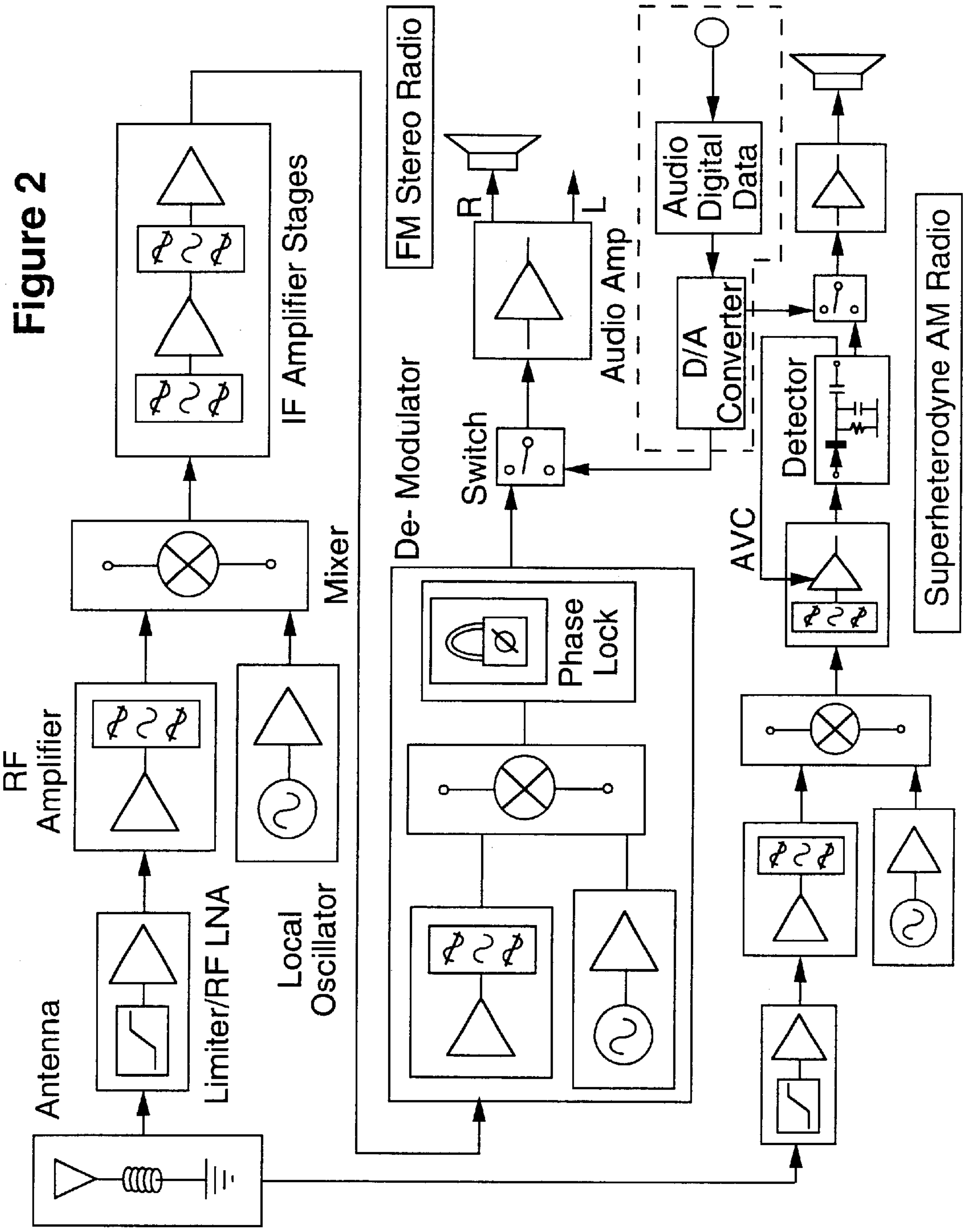
FIG. 2. shows a generic block diagram which represents the hardware functions of key components of conventional analog FM and AM radios, along with an insertion switch which would allow integration of digital audio output signals to allow compatibility of satellite and terrestrial digital radio with existing analog radios.

FIG. 2 shows basic block diagram designs for conventional analog FM and AM radio receivers, which can be found in any basic electronics textbook. The satellite digital radio receiver can be integrated with conventional analog radios, as shown by the back end of the digital radio in the dashed box feeding the final audio amplification stage of the conventional FM and AM radios.

FIG. 3 shows an example of a TDM protocol (conceptually the most simple to explain) resulting in the frames of all the channels being loaded into a temporary main storage buffer. A frame identification word and audio data sample storage word examples for identifying the data are also shown. Finally, at the bottom of the figure, a hardware configuration to search the temporary main storage buffer for specific selected channel data and store the data in a temporary port buffer for transfer and analog conversion for receipt by a headset is provided as an example of how the SMART radio feature could be implemented. The figure shows a digital signal processing chip or board (DSP), which allows processing of the digital data and transfer via industry standard ISA bus architecture. An example DSP board is the Sonitech Corporation SPIRIT-40 AT/ISA board, which utilizes two Texas Instruments TMS320C40 DSP chips, a 32-bit floating point processor capable of 40–50 MFLOP peak processing power (40–50 nanosecond instruction cycle times). Six 20 Mbyte/sec ports with individual DMA controller provide high I/O bandwidth capability, and each chip has up to 4 Mbytes of local and 4 Mbytes of global SRAM. Each C40 bus provides transfer rates of 100 Mbytes/sec. Since audio transfer rates are roughly 44 kHz times 2 bytes (16 bit sample size) or 88 kbytes/sec, no transfer bottlenecks to D/A converters should exist. In addition, buffer frame searches should be limited to a few hundred software instructions, which would put a processing overhead of about 5 microseconds on the process of sorting the channel frame data to port buffers, which would not slow down output below the 44 kHz output stream rate requirement.

Figure 4:
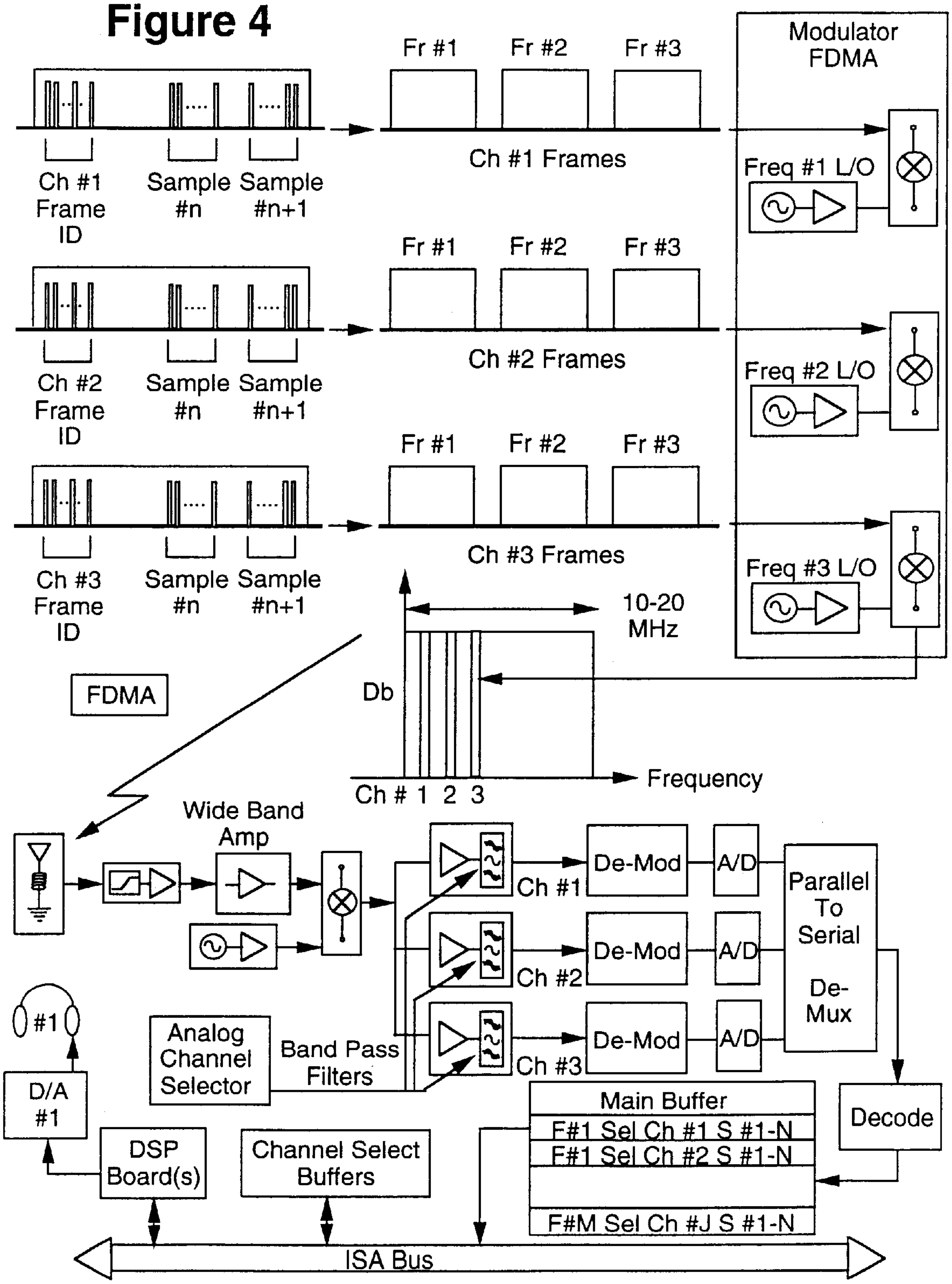
FIG. 4. illustrates an example multiplexing of parallel channels of digitized audio data using a OFDM protocol, prior to processing, modulation and transmission by a satellite digital radio system, and the hardware used separate the different channel frequencies and to enable simultaneous multi-user re-transmission to users headsets.
Figure 5:
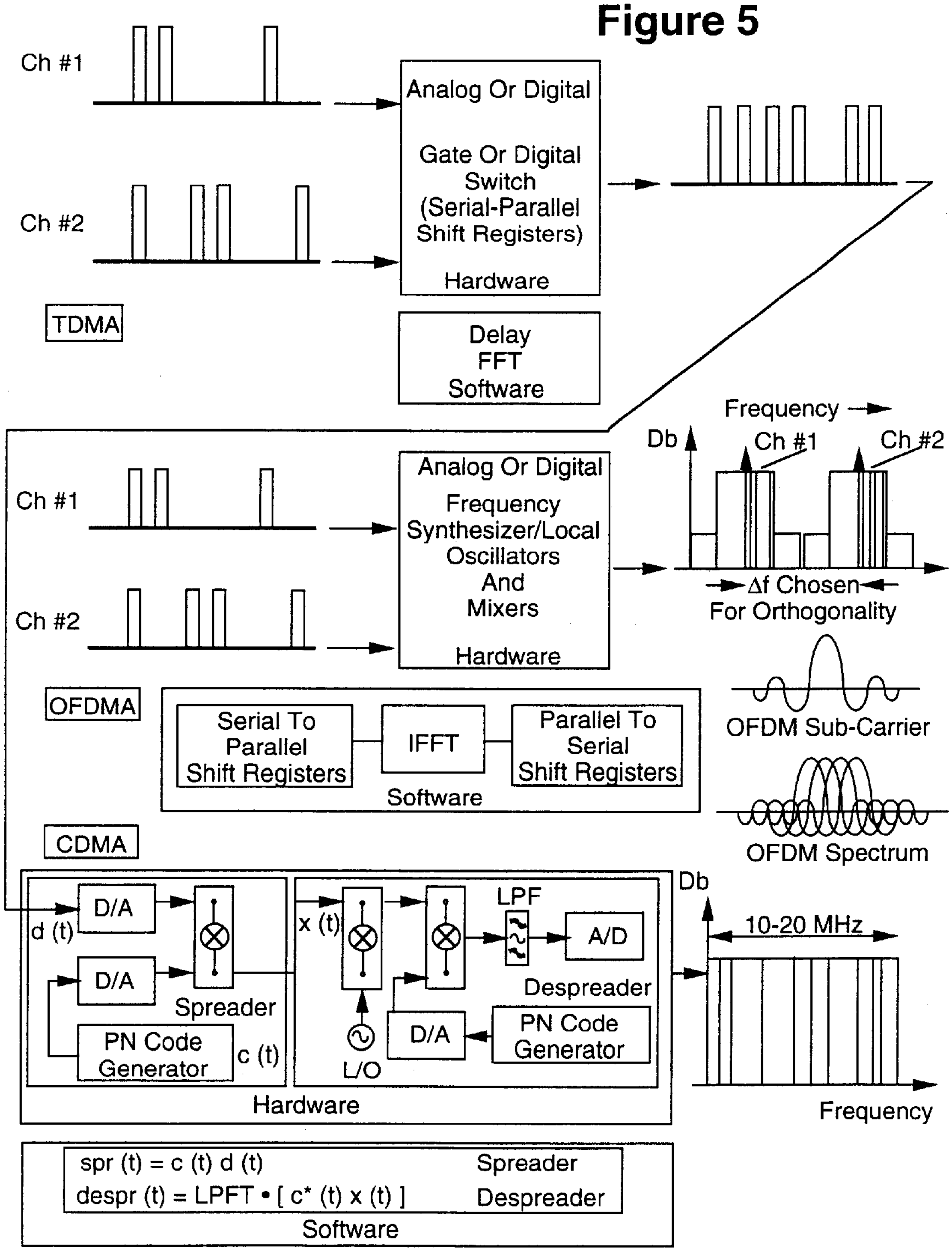
FIG. 5. shows generic block diagrams for audio digital sample pulse multiplexing, and hardware and software functions associated with the three common transmission protocols (TDMA, OFDMA and CDMA or spread spectrum).

FIG. 4 illustrates receiver processing for an FDM transmission protocol, with bandpass filters used to separate channel data. Alternatively, a parallel complex data configuration which employs baseband processing could be used, based on fast Fourier transform algorithms, as previously mentioned. FIG. 5 shows generic block diagrams for both hardware and software processing for each of the three types of transmission protocols. For the OFDMA protocol, each sub-carrier channel spectrum is a sinc(f) function, and the sub-carrier frequencies are selected to be orthogonal and thus can be separated at the receiver by correlation techniques. Normal FDMA protocol has 100 kHz SSB widths set by the FCC.

FIG. 6 illustrates the two headset linkage approaches which allow data to be sent to the headset from the receiver SMART radio sub-assembly unit. The hard-wire approach consists of female connector jacks 1 on the radio receiver, each representing a separate output port which can transfer one user-selected channel of data from a port buffer to a headset. A small unit 2 on the headset allows the user to display and select the channel he wishes to hear, as well as control the volume of the sound. The hard wire approach reduces the complexity and cost of the headset assembly, since the amplification process can be accomplished at the radio receiver, and no detection electronics is required. The channel display can be a binary-to-decimal liquid crystal unit with backlighting for night time use. The channel selector can be a stepped binary register which feeds the display and sets 8 line sample and hold voltages for use by the SMART radio assembly in the main receiver. Volume control can be by simple potentiometer-set resistance attenuation of the incoming signal. The IR linkage approach can utilize IR wavelength signals transmitted from the radio receiver to a small receiver unit 3 attached to the headset assembly 4. The IR receiver consists of a wide-angle (e.g., "fish eye") gradient index (GRIN) lens 5, which can receive IR transmissions from almost a 180 degree angular field of view (e.g., "Ray Tracing Analysis for Media with Nonhomogeneous Indices of Refraction", N. C. Schoen, Applied Optics, Vol. 21, No. 18, pg. 3329, September 1982). An optional configuration could use compound IR transmitting lenses or mirrors to direct the IR signal to detection devices. Reception of scattered IR allows 360 degree signal detection. This signal is coupled by a fiber optic cable 10 or by conventional IR lenses to a narrow-band IR filter 6, which reduces background ambient light while passing the narrow-band IR signal transmitted at the radio receiver front panel. The IR light is directed to an IR detector 7 (e.g., germanium, zinc selenide room temperature detectors) where it is converted to an electrical signal. This signal can be amplified directly if it is audio analog modulated, or pass through a DIA converter 8 first if it is digital. After the audio amplification 9, the signal feeds directly into the headset earpiece for conversion to sound. Volume control is easily accomplished by the technique used in the hard wire linkage, or by adjusting the gain of the amplifier or IR detector in the headset assembly. The channel selector 11 can be as simple as a return IR signal with detector 13, produced by a laser diode 12 for example, that will increment the channel number with each burst (one-shot flip-flop driving the laser diode emitter, for example). A good analogy to the above channel selection design is that commonly found in the remote controls for current TV sets. IR circuitry may be duplicates of that provided as part of the receiver, since the CDRadio system proposes to use IR to couple the broadcast carrier signal picked up by the small antenna attached to the car back window to the radio receiver at the dashboard. An alternative to IR linkage is to utilize an RF system, similar to cordless telephones, whose frequency is FCC approved for very short broadcast distances.

FIG. 7 provides details of the software and hardware that constitute the SMART radio sub-assembly that integrates with the digital radio receiver. The hardware is based on use of a processing unit, such as a combination of DSP chips, ISA bus, RAM memory and associated circuitry to perform functions such as D/A and D/D conversion, I/O functions to transfer digital data, and analog output ports for audio signals. The DSP chips are "small computers", in that they have a CPU (central processing unit), an ALU (arithmetic logic unit), a local and global bus, and random access memory (RAM), which allow the same type of operations to be performed as with a personal computer. The SMART radio sub-assembly unit can be built using customized versions of currently produced DSP chips 20, and local or global RAM port buffers 21, which can store channel digital data for later conversion to analog audio signals, via a DIA converter 22 that could reside on a board with the DSP chips, or could be a separate board that interfaces with the DSP via an ISA bus 23. Channel selection hardware 24, consisting of standard decimal to binary conversion units found in current radios and TVs, provides a channel identification word for each physical external port on the SMART radio sub-assembly. This word is used by the software to search for the correct channel digital sample data.

Software flow diagrams are shown at the top of FIG. 7, and it is assumed that 32 bit words will be utilized. A possible frame identification method using the left-most "sign" bit of the word, and storage of digital sample data are shown 25 in pictorial fashion. The tag FEC would identify delayed digital data used for forward error correction (FEC) to mitigate signal loss or fade. Whatever frame and storage schemes are used by the digital radio manufacturer must also be used by the SMART radio sub-assembly. The main software routine (channel selection/transfer of data to selected port buffer) 27 assumes that all the digital data from all the channels will be temporarily accessible from a main RAM buffer 26 built into the digital radio receiver. The order in which the data is stored is determined by the transmission protocol and processing algorithms chosen by the satellite digital radio corporation and hardware vendors. The routine determines the channel selected by the user-end hardware 24, and the port number, and then picks up the current main buffer address set when the last data transfer storage location was accessed. The word is masked to pick off the channel and frame data for comparison to that selected and the last frame/sample accessed. If the next sample in the sequence is correct, the data is moved to the appropriate port buffer 21, otherwise the next main buffer location is checked. Not shown is additional software to handle error conditions (missing data, etc.). The main buffer and port buffers have to "wrap", since data coming in must be moved out to make room for new data. The second software routine 28, handles the transfer of data out of the port buffer and routes it to a D/A converter 22 for output to a headset 4. Since the audio data must be properly sequenced, this software could reside in an interrupt routine driven by the D/A converter. It would set an interrupt flag when it is ready to convert the next digital sample to an analog audio voltage signal. The interrupt routine 28 would provide for the data transfer, but would not be under control of the main program. An alternate approach is to run this data transfer under direct memory access (DMA) control. This allows the data to be transferred rapidly autonomously, since the transfer takes place on a "clock cycle stealing" basis while other programs are executing. Both of these techniques are fairly standard in the computer industry, and thus detailed code for error escapes and other auxiliary functions are not shown.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A digital audio signal processing and distribution sub-assembly unit device for satellite radio digital radio receivers, for extraction of COFDM/OFDM or CDM access protocol audio channel digital signals and simultaneous re-transmission to multiple user headsets, comprising;

digital signal processing means to extract from said radio receivers digital audio data from each broadcast channel and transfer said digital audio data to storage buffers for subsequent conversion to analog audio signals and transfer to individual users headsets;

software means to extract, transfer and control the processing of said digital audio data, wherein said digital signal processing means and said software means to extract from said radio receivers digital audio data from each broadcast channel includes baseband processing and other parallel-to-serial data extraction techniques for demultiplexing digital data that were created using frequency diversity algorithms used to process multiple audio channel data prior to broadcast transmission;

user port storage buffer means for temporary storage of extracted user selected digital audio data prior to conversion to said analog audio signals;

digital to analog converter means to convert said digital audio data to said analog audio signals;

industry standard computer bus architecture means for transferring said digital audio data to and from said storage, processing and digital processing means;

channel selection by remote means to allow each user to select said audio channel signals desired to be heard;

user audio headset means to allow a user to listen to said selected audio channel in the presence of other users without interference;

and means to transfer said audio channel signals, from said digital radio receiver containing said sub-assembly, to said user audio headsets.

2. A device according to claim 1, wherein said digital signal processing means and said software means to extract from said radio receivers digital audio data from each broadcast channel includes fast Fourier and other mathematical transforms for demultiplexing said digital data.

3. A device according to claim 1, wherein means to transfer said audio channel signals or digital audio signals to said user audio headsets operate in an automobile and include multi-wire cable connection via jack or multi-pin connectors, infra-red transmit/receive links or RF transmit/receive links.

4. A device according to claim 1, wherein said channel selection means include electronic circuits for decimal-to-binary conversion, liquid crystal or LED display units, and logic circuits comprising sample-and-hold and one-shot flip-flops to convert or increment channel selection switch settings to binary data for use by said storage, processing and digital processing means.

* * * * *